P. M. LINCOLN.
SYSTEM OF ELECTRICAL DISTRIBUTION.
APPLICATION FILED DEC. 3, 1906.

941,372.

Patented Nov. 30, 1909.
2 SHEETS—SHEET 2.

WITNESSES:

INVENTOR
Paul M. Lincoln
BY
ATTORNEY

UNITED STATES PATENT OFFICE.

PAUL M. LINCOLN, OF PITTSBURG, PENNSYLVANIA, ASSIGNOR TO WESTINGHOUSE ELECTRIC & MANUFACTURING COMPANY, A CORPORATION OF PENNSYLVANIA.

SYSTEM OF ELECTRICAL DISTRIBUTION.

941,372.

Specification of Letters Patent. Patented Nov. 30, 1909.

Application filed December 3, 1906. Serial No. 346,076.

*To all whom it may concern:*

Be it known that I, PAUL M. LINCOLN, a citizen of the United States, and a resident of Pittsburg, in the county of Allegheny and State of Pennsylvania, have invented a new and useful Improvement in Systems of Electrical Distribution, of which the following is a specification.

My invention relates to systems of alternating current electrical distribution, and it has for its object to provide means that shall be simple in arrangement and effective in operation for automatically equalizing the load on an electric generator by compensating for the current variations in the circuit supplied therefrom.

My improved equalizing system comprises, in general, a rotary converter or other current-rectifying device, a storage battery connected thereto, and a booster generator interposed between the main circuit and the rotary converter.

Figure 1:
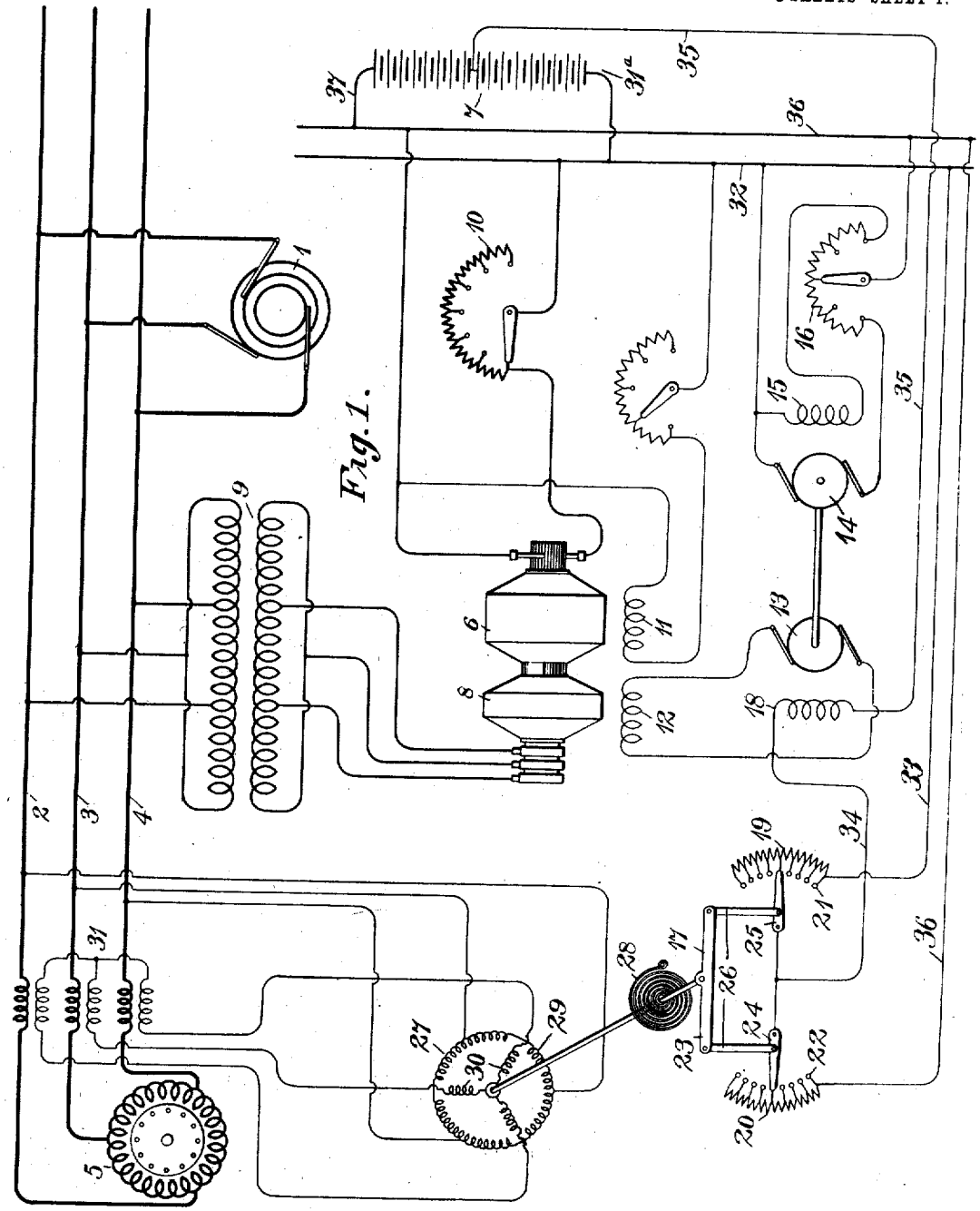
Figure 2:
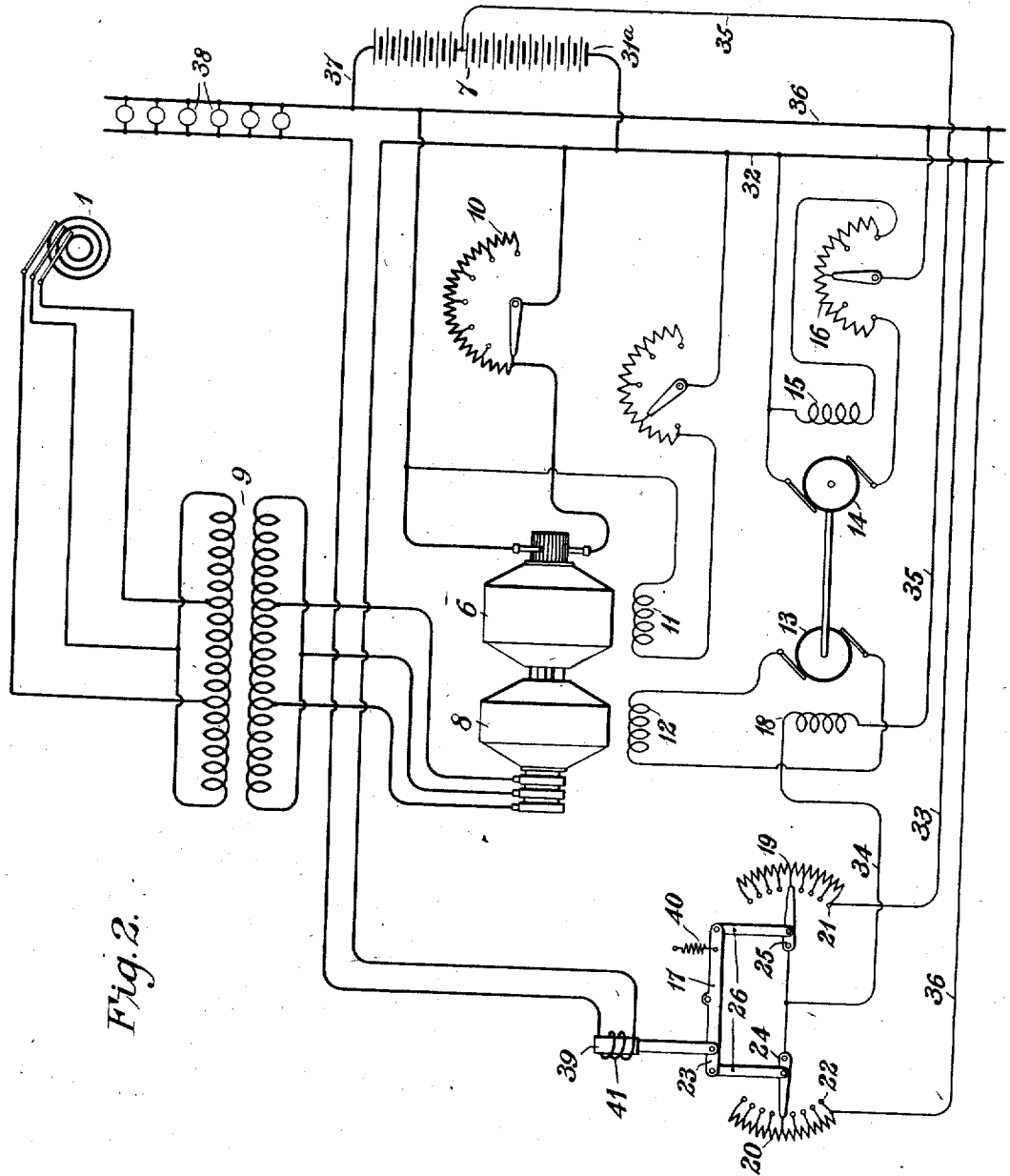

Figure 1 of the accompanying drawings is a diagrammatic view of a system of distribution embodying my invention, and Fig. 2 is a similar view of a modified system in which a correction is made for the fluctuations of load on the direct current circuits of the system.

Referring to Fig. 1 of the drawings, electrical energy is supplied from a generator 1, through main line conductors 2, 3 and 4, to a motor 5, which may be employed for operating the rolls in a steel mill or for other purposes. In order that the demands upon the generator 1 may be substantially constant and of a minimum amount, irrespective of the varying loads on the motor 5, an equalizing system is provided which comprises a rotary converter 6, a storage battery 7 connected thereto, and a booster generator 8 that is connected to the line conductors 2, 3 and 4 through a transformer 9 and is mechanically coupled and electrically connected to the rotary converter 6.

The relative angular position of the armatures of the rotary converter and the booster generator is such that the electromotive force of the booster generator is in phase with the alternating current electromotive force of the rotary converter and of the line. When these conditions obtain, the electromotive force of the booster will either directly oppose or directly assist the electromotive force of the line, according to its field excitation.

The rotary converter is provided with a field magnet winding 11 and with a starting rheostat 10 which is included in the direct current external circuit of the machine, energy being supplied from the storage battery 7 for field excitation and in starting. The field magnet winding 12 of the booster generator 8 is energized from an exciter 13 which is driven by a motor 14. The motor 14 may be of any suitable constant speed variety and may be energized from any convenient source, such as the storage battery 7, and it is provided, in the usual manner, with a field magnet winding 15 and a starting rheostat 16.

The operation of the equalizer is as follows: Assuming that, under average load conditions, the field magnet winding 12 of the booster generator 8 is deënergized; that the rotary converter is operating in synchronism with the generator 1, and that the number of cells comprised in the storage battery 7 is such that the normal voltage of the battery corresponds to the direct current voltage of the rotary converter, the current taken from the generator under varying loads may be equalized by suitably exciting the field magnet winding of the booster generator.

If the field magnet winding 12 is supplied with energy that depends, in direction and amount, upon the variations in current in the main circuit above and below the predetermined amount for average conditions, energy will be supplied to the storage battery 7 when the load on the motor 5 is light and energy will be taken from the battery when the load on the motor is relatively heavy.

In order that the regulation of the equalizer may be automatic, a balanced regulator 17 is employed to govern the energy supplied to the field magnet winding 18 of the exciter 13. This regulator comprises two similar resistances 19 and 20, which are divided into a plurality of sections by contact members 21 and 22, a rocking beam 23 and movable contact arms 24 and 25 that are connected by links 26 to the opposite ends of the rocking beam. The position of the rocking beam may be determined by the torque of a motor 27 which acts in opposition to a spring 28. When a predetermined current traverses the circuit 2—3—4, the torque exerted by the motor completely neutralizes the action of the spring, the rocking beam 23 occupies its mid position and the movable contact arms 24 and 25 make electrical connection to the middle points of the resistances 19 and 20. Corresponding terminals of the resistances are connected to opposite terminals of the storage battery 7 and the movable contact arms 24 and 25 are connected to the neutral point of the battery through the field magnet winding 18.

A stator winding 29 of the motor 27 is delta-connected to the line conductors 2, 3 and 4 and a rotor winding 30 is energized from the star-connected secondary of a three-phase series transformer 31 the primary coils of which are connected in the interrupted line circuits 2, 3 and 4. The motor windings are so designed as to exert a torque equal and opposite to the spring 28 when the rocking beam occupies its mid-position and when a definite current value corresponding to the average load on the system traverses the main line conductors 2, 3 and 4. Under these conditions, as hereinbefore explained, contact is made to the middle points of the resistances 19 and 20 by the arms 24 and 25 and, consequently, no current is supplied to the field magnet winding 12 of the exciter 13. If, however, the current traversing the main circuit exceeds the average amount, the motor torque will predominate and the rocking beam 23 will be so moved as to increase the active portion of the resistance 20 and to decrease that of the resistance 19. When these conditions obtain, energy will be supplied from the terminal 31ª of the battery 7 through conductors 32 and 33, the active portion of the resistance 19, contact arm 25 and conductor 34 to the field magnet winding 18, from which point circuit is completed to the neutral point of the battery. On the other hand, if the current traversing the main line circuit falls below the average amount, the spring torque will predominate and the rocking beam 23 would be so moved as to increase the active portion of the resistance 19 and to decrease the active portion of the resistance 20. Under these conditions, energy will be supplied from the neutral point of the battery 7, through conductor 35 to the magnet winding 18, and the circuit will be completed through conductor 34, contact arm 24, the active portion of the resistance 20 and conductor 36 to the terminal 37 of the battery.

It will be observed that energy supplied to the magnet winding 18 is reversed when the current in the main circuit varies from a value above a predetermined amount to a value below that amount and vice versa and, in accordance with well known principles, the reversal of this magnet winding will bring about the reversal of the current supplied to the magnet winding 12 of the booster generator 8.

Referring to Fig. 2, in which corresponding parts and circuits are designated by the same reference characters as those of Fig. 1, translating devices 38 are connected to the direct current circuit conductors 32 and 36.

An electro-magnet 39 acts on the arm 23 in opposition to a spring 40, to a greater or less degree, according to the amount of current taken from the circuit 32—36, since the magnet winding 41 is connected in series with the line conductor 32. Under these conditions, energy will be supplied both from the battery 7 and the direct current circuit of the rotary to the conductors 32 and 36, in case the booster voltage opposes that of the generator 1 or if the booster assists the generator voltage, energy will be supplied from the rotary converter, both to the load and to the battery, through the conductors 32 and 36.

The detailed operation of the system will readily be understood from that hereinbefore contained for the system of Fig. 1.

It is conceivable that various modifications in the circuit arrangements of the systems illustrated in the drawings may be effected without departing from the spirit of my invention, and, consequently, I desire that only such limitations shall be imposed as are indicated in the appended claims.

I claim as my invention:

The combination with an alternating current circuit, a rotary converter, a storage battery connected thereto, and a booster generator interposed between the circuit and the rotary converter, of a field magnet winding for the booster generator, an exciter generator therefor, a field magnet winding for the exciter, reversing means for said winding comprising two similar resistances connected to opposite ends of the storage battery, means for connecting the field magnet winding between a neutral point of the battery and intermediate points in the said resistances, and an operating motor for simultaneously varying the points of connections to the resistances in opposite directions, and current and voltage windings for the motor that are energized from the alternating current circuit.

In testimony whereof, I have hereunto subscribed my name this 28th day of November, 1906.

PAUL M. LINCOLN.

Witnesses:
H. T. OLSEN,
BIRNEY HINES.